(12) United States Patent
Yoshida et al.

(10) Patent No.: US 7,824,795 B2
(45) Date of Patent: Nov. 2, 2010

(54) SOLID ELECTROLYTE STRUCTURE FOR ALL-SOLID-STATE BATTERY, ALL-SOLID-STATE BATTERY, AND THEIR PRODUCTION METHODS

(75) Inventors: Toshihiro Yoshida, Nagoya (JP); Kazuhiro Yamamoto, Nagoya (JP); Kiyoshi Kanamura, Hachioji (JP)

(73) Assignees: NGK Insulators, Ltd., Nagoya (JP); Tokyo Metropolitan University, Shinjuku-ku (JP)

( * ) Notice: Subject to any disclaimer, the term of this patent is extended or adjusted under 35 U.S.C. 154(b) by 0 days.

(21) Appl. No.: 12/434,806

(22) Filed: May 4, 2009

(65) Prior Publication Data
US 2009/0226816 A1    Sep. 10, 2009

Related U.S. Application Data

(63) Continuation of application No. PCT/JP2007/072489, filed on Nov. 14, 2007.

(30) Foreign Application Priority Data

Nov. 14, 2006   (JP)   ............................. 2006-308146

(51) Int. Cl.
*H01M 10/0562* (2010.01)
(52) U.S. Cl. ...................................... 429/162; 429/122

(58) Field of Classification Search ................. 429/304, 429/305, 306, 319, 320, 322; *H01M 4/02, H01M 4/62, 10/36, 10/40*
See application file for complete search history.

(56) References Cited

U.S. PATENT DOCUMENTS

| 5,871,866 | A | * | 2/1999 | Barker et al. | ............. | 429/231.1 |
| 2007/0202400 | A1 | | 8/2007 | Yoshida et al. | | |
| 2007/0202414 | A1 | | 8/2007 | Yoshida et al. | | |
| 2007/0259271 | A1 | | 11/2007 | Nanno et al. | | |

FOREIGN PATENT DOCUMENTS

| JP | 05-205741 A | | 8/1993 |
| JP | 2000-311710 A | | 11/2000 |
| JP | 2003-346895 A | | 12/2003 |
| JP | 2006-260887 | * | 9/2006 |
| JP | 2006-260887 A | | 9/2006 |
| JP | 2007-258148 A | | 10/2007 |
| WO | 2006/064774 A | | 6/2006 |

* cited by examiner

*Primary Examiner*—Jerry Lorengo
*Assistant Examiner*—Jared Wood
(74) *Attorney, Agent, or Firm*—Burr & Brown

(57) ABSTRACT

A solid electrolyte structure (1) for all-solid-state batteries includes a plate-like dense body (2) formed of a ceramic that includes a solid electrolyte, and a porous layer (3) formed of a ceramic that includes a solid electrolyte that is the same as or different from the solid electrolyte of the dense body (2), the porous layer (3) being integrally formed on at least one surface of the dense body (2) by firing. The solid electrolyte structure can reduce the contact resistance at the interface between the solid electrolyte and an electrode.

4 Claims, 6 Drawing Sheets

SOLID ELECTROLYTE STRUCTURE FOR ALL-SOLID-STATE BATTERY, ALL-SOLID-STATE BATTERY, AND THEIR PRODUCTION METHODS

FIELD OF THE INVENTION

The present invention relates to a solid electrolyte structure for all-solid-state batteries, an all-solid-state battery, and methods of producing the same. More particularly, the present invention relates to a solid electrolyte structure for all-solid-state batteries that can reduce the contact resistance at the interface between the solid electrolyte and an electrode, an all-solid-state battery using the solid electrolyte structure, and methods of producing the same.

BACKGROUND OF THE INVENTION

In recent years, along with the remarkable development of portable instruments such as personal computers and portable telephones, batteries used to supply power to such portable instruments have been in great demand. In a battery used in such applications, a liquid electrolyte (electrolytic solution) utilizing a flammable organic solvent (dilution solvent) has been used as a medium through which ions move. A battery that utilizes such an electrolytic solution may ignite or explode due to leakage of the electrolytic solution, for example.

In order to solve such a problem, an all-solid-state battery that utilizes a solid electrolyte instead of a liquid electrolyte and is entirely formed of solid elements has been developed in order to ensure safety. Since the electrolyte of the all-solid-state battery is formed of a sintered ceramic (solid), leakage or ignition does not occur. Moreover, a deterioration in battery performance due to corrosion rarely occurs, for example. In particular, an all-solid-state lithium secondary battery has been extensively studied as a secondary battery of which the energy density can be easily increased (see Patent Document 1, for example).

The all-solid-state battery exhibits excellent safety and the like. On the other hand, since the entire electrolyte is solid, an improvement of ion conductivity of the solid electrolyte, a reduction of contact resistance (grain boundary resistance) between the electrolyte particles, and a reduction of contact resistance at the interface between the electrode and the electrolyte have been desired.

For example, since a liquid lithium ion secondary battery utilizes a liquid electrolyte, the space between the particles of the solid electrode and electrolyte is filled with the liquid electrolyte easily. Therefore, the contact area between the solid electrode and the liquid electrolyte does not correspond to the surface area of the solid electrode, but corresponds to the specific surface area of the solid electrode. The solid electrode advantageously comes in contact with the electrolyte when the solid electrode is sufficiently filled with the electrolyte.

Since the electrode and the electrolyte of the all-solid-state battery are solid, the contact area between the solid electrode and the electrolyte depends on the contact area between the particles of the solid electrode and the particles of the electrolyte. When the electrode and the electrolyte are not sufficiently sintered due to a low firing temperature, the particles of the solid electrode come in point-contact with the particles of the electrolyte. When the electrode and the electrolyte are sufficiently sintered so that the particles are fusion-bonded, the contact area between the particles increases so that the contact resistance (grain boundary resistance) at the interface decreases. Specifically, the contact resistance decreases as the contact area (necking) between the particles increases. However, since the reactivity of the materials must be taken into consideration when employing a firing temperature at which sufficient necking occurs, a substantial contact area cannot be easily obtained.

When producing an all-solid-state battery by way of trial, an electrode material (e.g., active material precursor) is applied to the flat surface of a solid electrolyte and is fired to form an electrode. In this case, the contact area does not exceed the area of the surface on which the electrode is formed. Since the contact area is the total area in which the particles of the electrode come in contact with the particles of the solid electrolyte, the contact area is generally smaller than the total surface area of the electrode.

In order to reduce the contact resistance (grain boundary resistance) at the interface between the electrode and the solid electrolyte, an all-solid-state battery in which a solid electrolyte is interposed between particles of an active material used for positive and negative electrodes has been disclosed (see Patent Document 2, for example). Specifically, the positive electrode and the negative electrode are formed by firing a green sheet obtained by forming a slurry prepared by mixing an active material and an electrolyte in the shape of a sheet, and the solid electrolyte (solid electrolyte layer) disposed between the electrodes is formed by firing a sheet formed only of a solid electrolyte material. The positive electrode, the solid electrolyte layer, and the negative electrode thus produced are press-bonded or fired under pressure to produce an all-solid-state battery. Such an all-solid-state battery is considered to allow an electrolyte network to be formed in the active material of the positive and negative electrodes.

Patent Document 1: JP-A-5-205741

Patent Document 2: JP-A-2000-311710

SUMMARY OF THE INVENTION

According to the method of producing the all-solid-state battery disclosed in Patent Document 2, if the active material and the solid electrolyte differ in sintering temperature, the contact resistance (grain boundary resistance) at the interface cannot be reduced so that excellent charge/discharge characteristics cannot be obtained. Specifically, the electrodes of the all-solid-state battery disclosed in Patent Document 2 are formed using a material prepared by mixing the positive/negative active material and the solid electrolyte. However, since the active material and the solid electrolyte differ in sintering temperature, a sufficient contact area (necking) cannot be formed when the material has a high sintering temperature.

On the other hand, when the active material and the solid electrolyte have a similar sintering temperature, the materials react with each other so that another substance is produced between the materials. As a result, the performance of the active material deteriorates so that the charge/discharge capacity may decrease or the reaction resistance may increase. Therefore, a material design that can overcome such problems is desired in order to maintain the performance of the active material while reducing the contact resistance.

In the charge/discharge process of the secondary battery, the active material repeatedly undergoes expansion and contraction when ions enter and leave the active material that forms the electrode. For example, since a liquid electrolyte having fluidity is used for a liquid secondary battery, the stress due to expansion and contraction is reduced so that the interface between the electrode and the electrolyte is not affected.

On the other hand, since the stress due to expansion and contraction directly acts on the interface between the electrode and the electrolyte of the all-solid-state battery, cracks and the like occur at the interface between the electrode and the electrolyte so that delamination occurs. As a result, the charge/discharge operation is hindered. When delamination occurs to a larger extent, the function of the battery is impaired.

The present invention was conceived in view of the above-described problems. An object of the present invention is to provide a solid electrolyte structure for all-solid-state batteries that can reduce the contact resistance at the interface between the solid electrolyte and an electrode, and can effectively disperse and reduce the stress caused by expansion and contraction of an active material during the charge/discharge process, an all-solid-state battery using such a solid electrolyte structure, and methods of producing the same.

The inventors of the present invention conducted extensive studies in order to achieve the above object. As a result, the inventors found that the above object can be achieved by a solid electrolyte structure obtained by integrating a dense layer and a porous layer by firing. This finding has led to the completion of the present invention.

According to the present invention, a solid electrolyte structure for all-solid-state batteries, an all-solid-state battery, and methods of producing the same given below are provided.

[1] A solid electrolyte structure for all-solid-state batteries, the solid electrolyte structure comprising a plate-like dense body formed of a ceramic that includes a solid electrolyte, and a porous layer formed of a ceramic that includes a solid electrolyte that is the same as or different from the solid electrolyte of the dense body, the porous layer being integrally formed on at least one surface of the dense body by firing.

[2] The solid electrolyte structure according to [1], wherein the porous layer has a porosity of 10 to 70 vol %.

[3] The solid electrolyte structure according to [1] or [2], wherein the porous layer is integrally formed on each surface of the dense body by firing.

[4] The solid electrolyte structure according to any one of [1] to [3], wherein each of the solid electrolyte included in the ceramic that forms the dense body and the solid electrolyte included in the ceramic that forms the porous layer is a phosphoric acid compound.

[5] An all-solid-state battery comprising the all-solid-state battery according to any one of [1] to [4], and an electrode formed of an active material, pores in the porous layer of the solid electrolyte structure being filled with the active material.

[6] The all-solid-state battery according to [5], wherein the pores in the porous layer are filled with the active material in a state in which the pores have an opening therein.

[7] The all-solid-state battery according to [5] or [6], wherein the solid electrolyte structure has been sintered by firing a ceramic material that includes the solid electrolyte, and the solid electrolyte has a sintering temperature higher than that of the active material that forms the electrode.

[8] The all-solid-state battery according to any one of [5] to [7], wherein the solid electrolyte is a phosphoric acid compound, and the active material is also a phosphoric acid compound.

[9] A method of producing a solid electrolyte structure for all-solid-state batteries, the method comprising: forming a first ceramic material that includes a solid electrolyte in a shape of a plate to obtain a first formed body, and firing the first formed body to form a dense body; and applying a second ceramic material that includes a solid electrolyte that is the same as or different from the solid electrolyte of the dense body to at least one surface of the dense body to form a second formed body, and firing the second formed body together with the dense body at a temperature lower than the firing temperature employed for the first formed body to form a porous layer that is integrally formed on the at least one surface of the dense body.

[10] A method of producing an all-solid-state battery comprising producing a solid electrolyte structure using the method according to [9], filling pores in a porous layer that forms the solid electrolyte structure with an active material precursor, and firing the active material precursor to form an electrode.

The solid electrolyte structure and the all-solid-state battery according to the present invention can show excellent charge/discharge characteristics due to a reduction of contact resistance at the interface between the solid electrolyte and the electrode. Moreover, the stress caused by expansion and contraction of the active material during the charge/discharge process can be effectively dispersed and reduced.

The method of producing a solid electrolyte structure and the method of producing an all-solid-state battery according to the present invention can produce the solid electrolyte structure and the all-solid-state battery to produce easily and inexpensively.

EXPLANATION OF SYMBOLS

1: solid electrolyte structure, 2: dense body, 3, 3a, 3b: porous layer, 4: pore, 10: all-solid-state battery, 11, 21, 22: electrode, 11a: positive electrode, 11b: negative electrode, 12: first formed body, 13: second formed body, 14: positive collector, 15: negative collector

DETAILED DESCRIPTION OF THE INVENTION

Preferred embodiments of the present invention are described below. Note that the present invention is not limited to the following embodiments. Various modifications and improvements may be made of the following embodiments without departing from the scope of the present invention based on the knowledge of a person skilled in the art.

[1] Solid Electrolyte Structure

Figure 1:
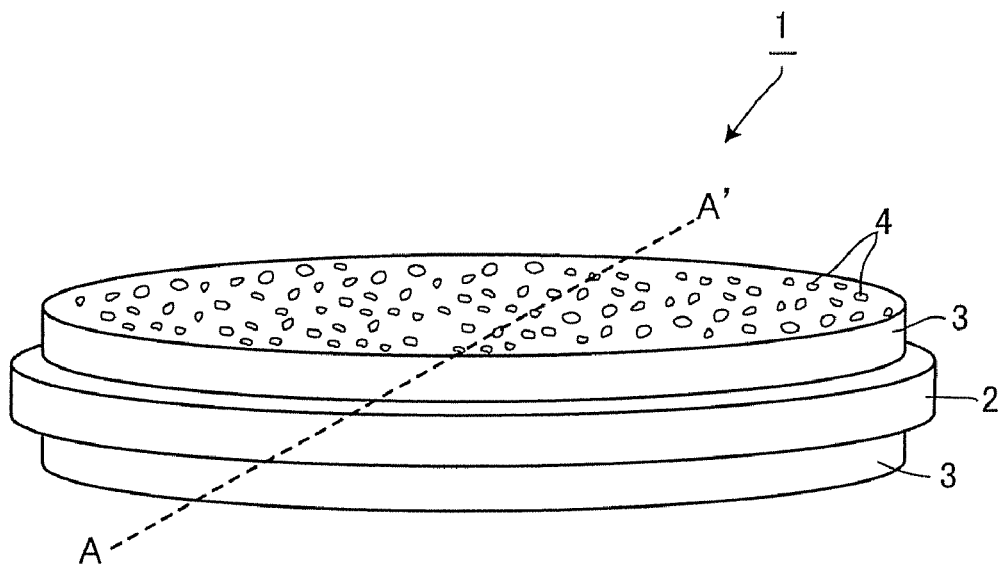
FIG. 1 is a perspective view showing a solid electrolyte structure according to one embodiment of the present invention.
Figure 2:
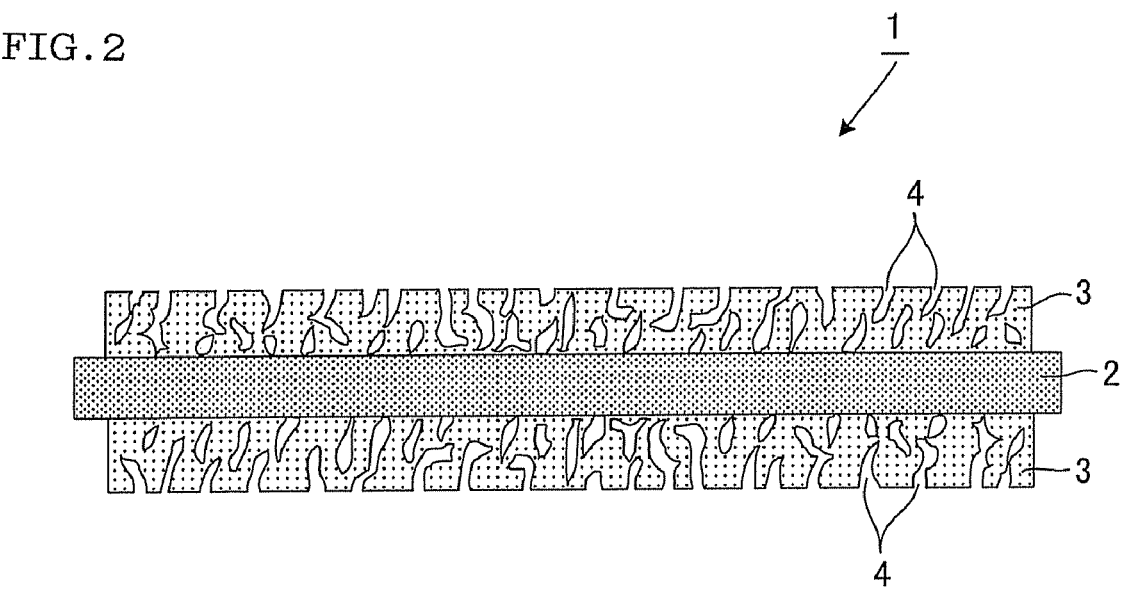
FIG. 2 is a schematic view illustrative of the configuration of the solid electrolyte structure according to one embodiment of the present invention, and showing the cross section of the solid electrolyte structure shown in FIG. 1 along the line A-A'.

A solid electrolyte structure for all-solid-state batteries (hereinafter may be simply referred to as "solid electrolyte structure") according to one embodiment of the present invention is described in detail below. FIG. 1 is a perspective view showing the solid electrolyte structure according to one embodiment of the present invention, FIG. 2 is a schematic view illustrative of the configuration of the solid electrolyte structure according to one embodiment of the present invention, and showing the cross section of the solid electrolyte structure shown in FIG. 1 along the line A-A'. As shown in FIGS. 1 and 2, a solid electrolyte structure 1 for all-solid-state batteries according to this embodiment includes a plate-like dense body 2 formed of a ceramic that includes a solid electrolyte, and a porous layer 3 formed of a ceramic that includes a solid electrolyte that is the same as or different from the solid electrolyte of the dense body 2, the porous layer 3 being integrally formed on at least one surface of the dense body 2 (each surface of the plate-like dense body 2 in FIGS. 1 and 2) by firing.

The term "porous layer" refers to a layer formed of a porous body having a number of pores that three-dimensionally extend from the surface to the inside of the porous body. When the solid electrolyte structure according to this embodiment is used for an all-solid-state battery, the pores are filled with an active material to form an electrode. The term "dense body" refers to a member that does not have the above-mentioned pores (i.e., pores are not positively formed). Specifically, the term "dense body" refers to a member in which the ceramic that includes the solid electrolyte is formed densely.

The solid electrolyte structure 1 according to this embodiment is a laminate in which the dense body 2 that substantially serves as a solid electrolyte and the porous layer 3 that can increases the contact area with the active material due to a large specific surface area are integrated by firing. The contact resistance at the interface between the solid electrolyte and the electrode can be reduced by filling pores 4 in the porous layer 3 with the active material to form an electrode so that excellent charge/discharge characteristics can be implemented.

Since the dense body 2 and the porous layer 3 are a laminate body having been integrated by firing, the contact state (necking) between the dense body 2 that substantially serves as a solid electrolyte and the porous layer 3 that is filled with the active material to form an electrode is improved. Therefore, the contact resistance (grain boundary resistance) between the dense body 2 and the porous layer 3 can be reduced as compared with an all-solid-state battery in which an electrode and an electrolyte layer are merely stacked and bonded under pressure.

When the pores in the porous layer are filled with the active material, the interface between the active material and the electrolyte is formed three-dimensionally and randomly. Therefore, since the stress caused by expansion and contraction of the active material during the charge/discharge operation occurs three-dimensionally and randomly, the stress can be effectively dispersed and reduced.

[1-1] Dense Body

The dense body 2 of the solid electrolyte structure 1 according to this embodiment is formed of a ceramic that includes a solid electrolyte. The dense body 2 is in the shape of a plate. The dense body 2 is disposed to separate the positive electrode and the negative electrode of the all-solid-state battery, and substantially serves as a solid electrolyte.

The solid electrolyte included in the ceramic that forms the dense body 2 is not particularly limited. A known solid electrolyte may be used. For example, a solid electrolyte that includes lithium as a mobile ion may be suitably used as the solid electrolyte included in the ceramic that forms the dense body 2. Examples of an electrolyte preferably used as the solid electrolyte include $Li_3PO_4$, LiPON prepared by mixing nitrogen with $Li_3PO_4$, a lithium ion conductive glassy solid electrolyte (e.g., $Li_2S$—$SiS_2$, $Li_2S$—$P_2S_5$, and $Li_2S$—$B_2S_3$), a lithium ion conductive solid electrolyte prepared by doping such a glassy solid electrolyte with a lithium halide (e.g., LiI) or a lithium oxyacid salt (e.g., $Li_3PO_4$), and so on. Especially among these, a titanium oxide-type solid electrolyte that contains lithium, titanium, and oxygen (e.g., $Li_xLa_yTiO_3$ (wherein 0<x<1 and 0<y<1)), a phosphoric acid compound (particularly a NASICON-type phosphoric acid compound) (e.g., $Li_{1+x}Al_xTi_{2-x}(PO_4)_3$ and $Li_{1+x}Al_xGe_{2-x}(PO_4)_3$ (wherein 0<x<1), and the like are preferable since these compounds exhibit stable performance during firing in an oxygen atmosphere.

Specific examples of a more preferable solid electrolyte include $Li_{0.35}La_{0.55}TiO_3$ and the like. The solid electrolyte is still more preferably $Li_{1.5}Al_{0.5}Ge_{1.5}(PO_4)_3$ that is a NASICON-type phosphoric acid compound.

The thickness of the dense body 2 is not particularly limited, but is preferably 5 μm to 1 mm, and more preferably 5 to 100 μm.

[1-2] Porous Layer

The porous layer 3 of the solid electrolyte structure 1 according to this embodiment is formed of a ceramic that includes a solid electrolyte that is the same as or different from the solid electrolyte of the dense body 2, and is integrally formed on at least one surface of the dense body 2 by firing. The porous layer 3 has a number of pores 4 that three-dimensionally extend from the surface to the inside of the porous layer 3. When the solid electrolyte structure 1 is used for an all-solid-state battery, the pores 4 are filled with the active material to form an electrode.

The solid electrolyte included in the ceramic that forms the porous layer 3 is not particularly limited. A known solid electrolyte may be used. For example, any of the substances mentioned above as the solid electrolyte of the dense body 2 may be used as the solid electrolyte. The solid electrolyte of the porous layer 3 may be the same as or different from the solid electrolyte of the dense body 2. It is preferable to use the same solid electrolyte as that of the dense body 2 since the contact resistance between the porous layer 3 and the dense body 2 can be further reduced. In the solid electrolyte structure 1 according to this embodiment, it is preferable that each of the solid electrolyte included in the ceramic that forms the dense body 2 and the solid electrolyte included in the ceramic that forms the porous layer 3 be a phosphoric acid compound, for example. According to this configuration, the internal resistance of an all-solid-state battery produced using the solid electrolyte structure can be reduced.

The thickness of the porous layer 3 is not particularly limited, but is preferably 5 μm to 1 mm, and more preferably 5 to 500 μm.

The porosity of the porous layer 3 is preferably 10 to 70 vol %, and more preferably 30 to 60 vol %. The term "porosity" used herein refers to a value measured by mercury porosimetry.

It suffices that the porous layer 3 be integrally formed on at least one surface of the dense body 2 by firing. However, it is preferable that the porous layer 3 be formed on each surface of the dense body 2, as shown in FIGS. 1 and 2. According to this configuration, the positive electrode and the negative electrode of the all-solid-state battery can be formed in the pores 4 in the respective porous layers 3. When the porous layer 3 is formed on only one surface of the dense body 2 (not shown), one of the positive electrode and the negative electrode is formed in the pores in the porous layer, and the other of the positive electrode and the negative electrode is disposed on the surface of the dense body opposite to the side on which the porous layer is formed to obtain an all-solid-state battery.

The porous layer 3 may be formed using a ceramic material that includes optimum amounts of a binder and an organic solvent in addition to the solid electrolyte corresponding to the shape of the pores 4 formed in the porous layer 3, or may be formed using a ceramic material that further includes a pore-forming agent (e.g., theobromine, starch, or carbon) that is appropriately selected corresponding to the firing atmosphere, for example.

[2] Method of Producing Solid Electrolyte Structure

A method of producing a solid electrolyte structure according to one embodiment of the present invention is described in detail below. The method of producing a solid electrolyte structure according to this embodiment is used to produce the solid electrolyte structure 1 for all-solid-state batteries shown in FIGS. 1 and 2 that includes the dense body 2 formed of a ceramic that includes a solid electrolyte, and the porous layer 3 formed of a ceramic that includes a solid electrolyte that is integrally formed on at least one surface of the dense body 2 by firing.

Figure 3:
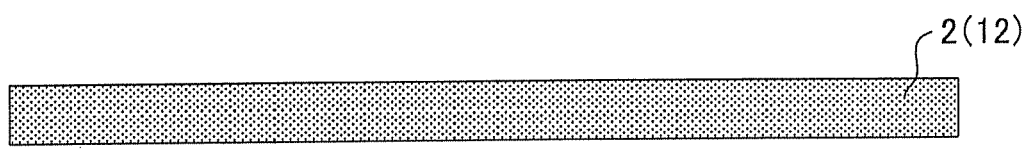
FIG. 3 is a schematic view illustrative of a step (1) of a method of producing a solid electrolyte structure according to one embodiment of the present invention.
Figure 4:
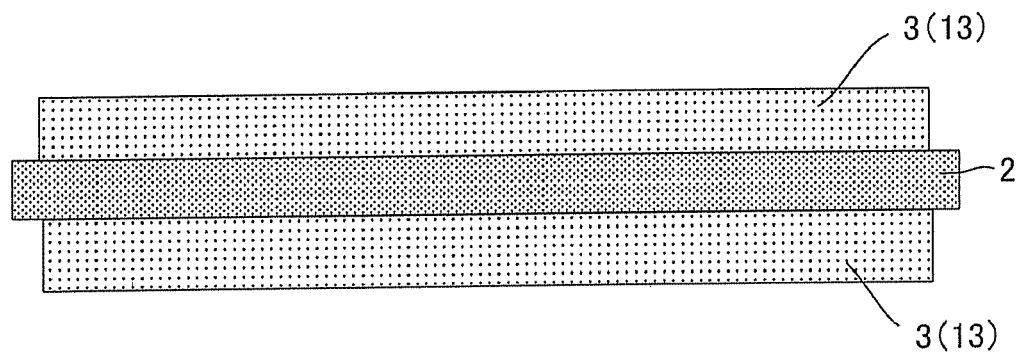
FIG. 4 is a schematic view illustrative of a step (2) of a method of producing a solid electrolyte structure according to one embodiment of the present invention.

The method of producing a solid electrolyte structure according to this embodiment includes: forming a first ceramic material that includes a solid electrolyte in the shape of a plate to obtain a first formed body 12, and firing the first formed body 12 to form a dense body 2 (see FIG. 3) (hereinafter referred to as "step (1)"); and applying a second ceramic material that includes a solid electrolyte that is the same as or different from the solid electrolyte of the dense body 2 to at least one surface of the dense body 2 (each surface of the dense body 2 in FIG. 4) to form a second formed body 13, and firing the second formed body 13 together with the dense body 2 at a temperature lower than the firing temperature employed for the first formed body 12 (see FIG. 3) to form a porous layer 3 that is integrally formed on at least one surface of the dense body 2 (see FIG. 4) (hereinafter referred to as "step (2)"). FIG. 3 is a schematic view illustrative of the step (1) of the method of producing a solid electrolyte structure according to one embodiment of the present invention, and FIG. 4 is a schematic view illustrative of the step (2) of the method of producing a solid electrolyte structure according to one embodiment of the present invention.

According to the above configuration, the solid electrolyte structure 1 shown in FIG. 1 can be easily and inexpensively produced. Each step of the method of producing a solid electrolyte structure according to this embodiment is described in detail below.

[2-1] Step (1)

In the step (1), the dense body 2 of the solid electrolyte structure 1 (see FIG. 1) is formed, as shown in FIG. 3. The first formed body 12 may be formed by a press method, a doctor-blade method, a reverse roll coating method, or the like. When using a press method, a die or the like is filled with the powdery first ceramic material that includes a solid electrolyte, and the first ceramic material is pressurized to obtain the first formed body 12.

When using a doctor-blade method or a reverse roll coating method, a binder such as polyvinyl alcohol is mixed with the first ceramic material that includes a solid electrolyte to obtain a mixture. An organic solvent such as toluene is added to the mixture to prepare a slurry. The slurry is formed into a thin film or a sheet having a given thickness using a doctor-blade method or a reverse roll coating method to obtain the first formed body 12. In this case, the first formed body 12 is preferably dried after forming. The first formed body 12 may optionally be cut, for example.

The shape and the thickness of the first formed body 12 may be appropriately selected corresponding to the configuration of the all-solid-state battery produced using the solid electrolyte structure. For example, the thickness of the first formed body 12 is preferably 5 μm to 1 mm, and more preferably 5 to 100 μm.

The first formed body 12 thus obtained is fired in a given atmosphere under firing conditions set corresponding to the type of solid electrolyte to form the dense body 2.

[2-2] Step (2)

In the step (2), the porous layer 3 is integrally formed by firing on at least one surface of the plate-like dense body 2 obtained by the step (1), as shown in FIG. 4.

In the step (2), the second ceramic material that is fired to form the porous layer 3 is applied to at least one surface of the dense body 2 to obtain the second formed body 13. The second ceramic material may be applied using a screen printing method or the like.

The second ceramic material may include a solid electrolyte that is the same as or different from the solid electrolyte (the solid electrolyte of the dense body 2) used in the step (1). In the step (2), since the second ceramic material is applied to the dense body 2 to form the second formed body 13, a binder such as polyvinyl alcohol is mixed with the solid electrolyte to prepare a paste.

The second ceramic material may be a ceramic material that includes optimum amounts of a binder and an organic solvent in addition to the solid electrolyte corresponding to the shape of the pores formed in the porous layer 3, or may be a ceramic material that further includes a pore-forming agent (e.g., theobromine, starch, or carbon) that is appropriately selected corresponding to the firing atmosphere, for example. As the pore-forming agent, a material that is decomposed at a temperature lower than the firing temperature employed when forming the porous layer 3 is selected. The pore-forming agent disappears due to firing so that pores are formed.

It suffices that the second formed body 13 be formed on at least one surface of the dense body 2. However, it is preferable to form the second formed body 13 on each surface of the dense body 2 so that the positive electrode and the negative electrode of the all-solid-state battery can be formed in the pores in the respective porous layers 3.

The shape and the thickness of the second formed body 13 may be appropriately selected corresponding to the configuration of the all-solid-state battery produced using the solid electrolyte structure. For example, the thickness of the second formed body 13 is preferably 5 µm to 1 mm, and more preferably 5 to 500 µm.

It is preferable to dry the second formed body 13 obtained by applying the second ceramic material in order to volatilize the binder contained in the second ceramic material.

The second formed body 13 is then fired together with the dense body 2 at a temperature lower than the firing temperature employed for the first formed body 12 (see FIG. 3) to form the porous layer 3 that is integrally formed on at least one surface of the dense body 2. The firing operation can be completed before the pores formed by decomposition of the binder, the pore-forming agent, and the like are lost due to shrinkage, by firing the second formed body 13 at a temperature lower than the firing temperature employed for the first formed body 12 (see FIG. 3). Therefore, the porous layer 3 that has a number of pores that three-dimensionally extend from the surface to the inside of the porous layer 3 can be formed advantageously. The firing temperature may be appropriately determined corresponding to the types of solid electrolyte, binder, pore-forming agent, and so on.

An excellent contact area (necking) between the particles of the porous layer 3 can be formed by firing the second formed body 13 at a temperature lower than the firing temperature employed for the first formed body 12 (see FIG. 3). Moreover, an excellent contact area (necking) can also be formed at the interface between the dense body 2 and the porous layer 3. If the firing temperature is too low, necking between the particles may become insufficient so that the contact resistance (grain boundary resistance) at the interface between the dense body 2 and the porous layer 3 may increase. It is preferable that the firing temperature employed for the second formed body 13 be lower than the firing temperature employed for the first formed body 12 (see FIG. 3) by 10 to 200° C., and more preferably 30 to 100° C., for example.

The solid electrolyte structure 1 for all-solid-state batteries shown in FIGS. 1 and 2 that includes the dense body 2 formed of a ceramic that includes a solid electrolyte and the porous layer 3 formed of a ceramic that includes a solid electrolyte that is the same as or different from the solid electrolyte of the dense body 2 and is integrally formed on at least one surface of the dense body 2 (each surface of the dense body 2 in FIG. 1) by firing, can be produced in this manner.

[3] All-Solid-State Battery

Figure 5:
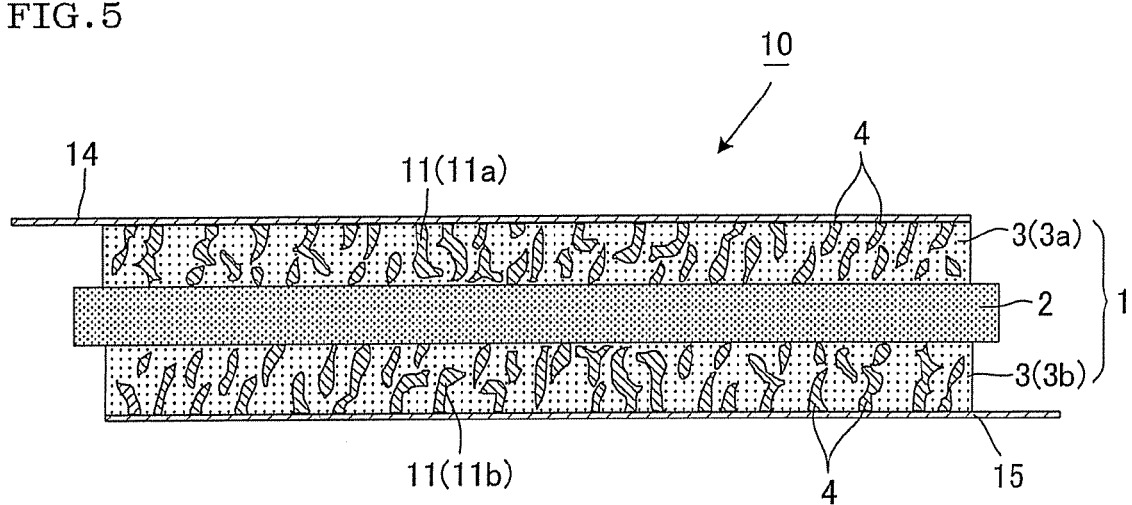
FIG. 5 is a schematic view illustrative of the configuration of an all-solid-state battery according to one embodiment of the present invention.

An all-solid-state battery according to one embodiment of the present invention is described in detail below. FIG. 5 is a schematic view illustrative of the configuration of the all-solid-state battery according to one embodiment of the present invention. As shown in FIG. 5, an all-solid-state battery 10 according to this embodiment includes the solid electrolyte structure 1 (see FIG. 1) according to one embodiment of the present invention, and an electrode 11 formed of an active material provided in the pores 4 in the porous layer 3 of the solid electrolyte structure 1.

In the all-solid-state battery 10 according to this embodiment shown in FIG. 5, the porous layer 3 (3a and 3b) is formed on each surface of the dense body 2 of the solid electrolyte structure 1. A positive electrode 11a is formed of an active material in the pores 4 in one porous layer 3a, and a negative electrode 11b is formed of an active material in the pores 4 in the other porous layer 3b. A positive collector 14 is electrically connected to the positive electrode 11a. A negative collector 15 is electrically connected to the negative electrode 11b.

In the all-solid-state battery 10 according to this embodiment, the dense body 2 of the solid electrolyte structure 1 (see FIG. 1) according to one embodiment of the present invention substantially serves as a solid electrolyte of the all-solid-state battery 10, and the positive electrode 11a and the negative electrode 11b formed of the active material in the pores 4 in the porous layer 3 having a large specific surface area are disposed on either side of the dense body 2. Therefore, excellent charge/discharge characteristics can be implemented by reducing the contact resistance at the interface between the solid electrolyte and the electrode.

Since the dense body 2 and the porous layer 3 that form the solid electrolyte structure 1 are integrated by firing, the contact state (necking) between the dense body 2 that substantially serves as a solid electrolyte and the porous layer 3 that is filled with the active material to form an electrode is improved. Therefore, the contact resistance between the dense body 2 and the porous layer 3 can be reduced as compared with an all-solid-state battery in which an electrode and an electrolyte layer are merely stacked and bonded under pressure.

Figure 6:
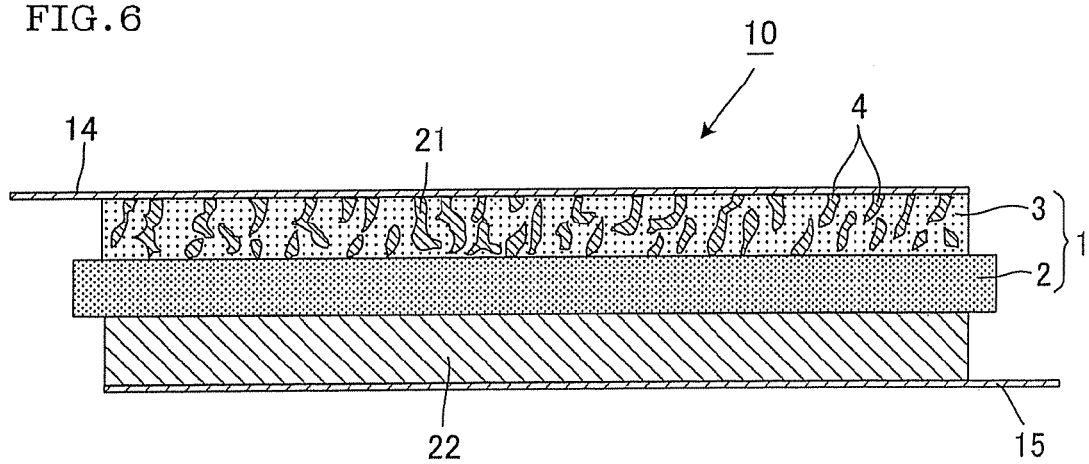
FIG. 6 is a schematic view illustrative of the other configuration of an all-solid-state battery according to another embodiment of the present invention.

In the all-solid-state battery 10 shown in FIG. 5, the porous layer 3 (3a and 3b) is formed on each surface of the dense body 2 of the solid electrolyte structure 1. Note that the porous layer 3 may be formed only on one surface of the dense body 2 of the solid electrolyte structure 1, as shown in FIG. 6. In this case, an electrode 21 (e.g., positive electrode) may be formed of the active material in the pores 4 in the porous layer 3, and an electrode 22 (e.g., negative electrode) formed separately may be disposed on the side of the dense body 2 opposite to the surface on which the porous layer 3 is formed. Even when using the solid electrolyte structure 1 in which the porous layer 3 is formed only on one surface of the dense body 2, excellent charge/discharge characteristics can be implemented due to a reduction in contact resistance at the interface between the solid electrolyte and the electrode.

[3-1] Solid Electrolyte Structure

As shown in FIG. 5, a solid electrolyte structure configured in the same manner as the above-described solid electrolyte structure 1 (see FIG. 1) according to one embodiment of the present invention may be suitably used for the all-solid-state battery 10 according to this embodiment. The types of solid electrolyte included in the ceramics that form the dense body 2 and the porous layer 3 of the solid electrolyte structure 1 may be appropriately selected corresponding to the type of the active material that forms the positive electrode 11a and the negative electrode 11b.

In the all-solid-state battery 10 according to this embodiment, it is preferable that the solid electrolyte that forms the solid electrolyte structure 1 have a sintering temperature higher than that of the active material that forms the electrode 11. According to this configuration, the reactivity of the active materials with the solid electrolyte structure suppressed during firing.

[3-2] Electrode

As shown in FIG. 5, at least one of the positive electrode 11a and the negative electrode 11b (the positive electrode 11a and the negative electrode 11b in FIG. 5) of the all-solid-state battery 10 according to this embodiment is formed of the active material in the pores 4 in the porous layer 3 of the solid electrolyte structure 1. The electrode 11 may be formed by filling the pores 4 in the porous layer 3 with an active material precursor.

When the porous layer 3 is formed only on one surface of the dense body 2 of the solid electrolyte structure 1 (see FIG. 6), the electrode 21 is formed of the active material provided in the pores 4 in the porous layer 3, and the electrode 22 is formed by an electrode material that includes the active material in the shape of a thin film or a sheet having a given thickness. The electrode 22 may be produced by a press method, a doctor-blade method, a roll coating method, or the like, and may be disposed on the side of the dense body 2 opposite to the surface on which the porous layer 3 is formed, by a sputtering method, a resistive heating deposition method that heats and deposits the deposition source using a resistor, an ion-beam deposition method that heats and deposits the deposition source using ion beams, an electron beam deposition method that heats and deposits the deposition source using electron beams, or the like.

The positive electrode 11a shown in FIG. 5 is formed of a positive electrode active material (positive active material). The positive active material is not particularly limited. A positive active material generally used for all-solid-state batteries may be used. When using a metal oxide as the positive active material, the secondary battery can be sintered in an oxygen atmosphere. Specific examples of the positive active material include manganese dioxide ($MnO_2$), iron oxide, copper oxide, nickel oxide, a lithium-manganese composite oxide (e.g., $Li_xMn_2O_4$ and $Li_xMnO_2$), a lithium-nickel complex oxide (e.g., $Li_xNiO_2$), a lithium-cobalt complex oxide (e.g., $Li_xCoO_2$), a lithium-nickel-cobalt complex oxide (e.g., $LiNi_{1-y}CO_yO_2$), a lithium-manganese-cobalt complex oxide (e.g., $LiMn_yCo_{1-y}O_2$), a spinel-type lithium-manganese-nickel complex oxide (e.g., $Li_xMn_{2-y}Ni_yO_4$), a lithium phosphate compound having an olivine structure (e.g., $Li_xFePO_4$, $Li_xFe_{1-y}Mn_yPO_4$, and $Li_xCoPO_4$), a lithium phosphate compound having a NASICON structure (e.g., $Li_xV_2(PO_4)_3$), iron sulfate ($Fe_2(SO_4)_3$), vanadium oxide (e.g., $V_2O_5$), and the like. These materials may be used either individually or in combination. It is preferable that $1<x<5$ and $0<y<1$.

The positive electrode may appropriately include an electron conduction assistant in addition to the positive active material. Examples of the electron conduction assistant include acetylene black, carbon black, graphite, carbon fibers, carbon nanotubes, and the like.

The electron conductivity in the layer that forms the electrode can be improved by adding the electron conduction assistant so that the internal resistance of the battery due to electron conduction can be reduced. The electron conduction assistant is used to assist the electron conductivity of the active material used as the electrode. The electron conduction assistant may not be added when the active material exhibits electron conductivity. When the active material does not exhibit electron conductivity, the electron conductivity is improved by adding the electron conduction assistant so that the battery characteristics can be improved.

Specific examples of a more preferable positive active material include $LiCoO_2$, $Li_xMn_2O_4$, $Li_xMnO_2$, and the like. The positive active material is still more preferably $Li_3V_2(PO_4)_3$ that is a lithium phosphate compound having a NASICON structure.

The negative electrode 11b is formed of a negative electrode active material (negative active material). The negative active material is not particularly limited. A negative active material generally used for all-solid-state batteries may be used. Examples of the negative active material include carbon, lithium metal (Li), a metal compound, a metal oxide, a Li metal compound, a Li metal oxide (including a lithium-transition metal complex oxide), boron-doped carbon, graphite, a compound having a NASICON structure, and the like. These materials may be used either individually or in combination. For example, the capacity of the all-solid-state battery can be increased when using lithium metal (Li).

Examples of carbon include a carbon material such as graphitic carbon, hard carbon, and soft carbon. Examples of the metal compound include LiAl, LiZn, $Li_3Bi$, $Li_3Cd$, $Li_3Sd$, $Li_4Si$, $Li_{4.4}Pb$, $Li_{4.4}Sn$, $Li_{0.17}C(LiC_6)$, and the like. Examples of the metal oxide include SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$, FeO, and the like. Examples of the Li metal compound include $Li_3FeN_2$, $Li_{2.6}CO_{0.4}N$, $Li_{2.6}Cu_{0.4}N$, and the like. Examples of the Li metal oxide (lithium-transition metal complex oxide) include a lithium-titanium complex oxide shown by $Li_4Ti_5O_{12}$ and the like. Examples of boron-doped carbon include boron-doped carbon, boron-doped graphite, and the like.

The negative electrode may appropriately include a conduction assistant in addition to the negative active material. A material similar to the conduction assistant mentioned for the positive active material may be suitably used. Examples of the compound having a NASICON structure include a lithium phosphate compound (e.g., $Li_xV_2(PO_4)_3$) and the like.

Specific examples of a more preferable negative active material include $Li_4Ti_5O_{12}$, $TiO_2$, and the like. The negative active material is still more preferably $Li_3V_2(PO_4)_3$ that is a lithium phosphate compound having a NASICON structure.

In the all-solid-state battery according to this embodiment, it is preferable that the solid electrolyte included in the ceramic material that forms the solid electrolyte structure be a phosphoric acid compound, and the active material (positive active material and negative active material) be a phosphoric acid compound. This further reduces the internal resistance of the all-solid-state battery.

The electrode 11 formed in the pores 4 in the porous layer 3 (see FIG. 5) may be formed using an active material precursor in which the refined active material is dispersed in the form of a colloid using an organic solvent, an aqueous solvent, pure water, or the like, or an active material precursor that is a sol of the active material, for example.

In the all-solid-state battery according to this embodiment, it is preferable that the pores in the porous layer be filled with the active material in a state in which the pores have an opening therein (i.e., the pores in the porous layer are not completely filled with the active material). The active material repeatedly undergoes expansion and contraction when ions enter and exit the porous layer during the charge/discharge operation of the battery. According to the above configuration, since the pores in the porous layer are not completely filled with the active material and have an opening, the stress caused by expansion and contraction of the active material is reduced so that delamination due to cracks and the like can be suppressed.

Examples of the material that forms the positive collector 14 and the negative collector 15 used for the all-solid-state battery 10 according to this embodiment include electron-conductive metal materials such as platinum (Pt), platinum (Pt)/palladium (Pd), gold (Au), silver (Ag), aluminum (Al), copper (Cu), indium-tin oxide (ITO), and an SUS plate.

[4] Method of Producing All-Solid-State Battery

A method of producing an all-solid-state battery according to one embodiment of the present invention is described in detail below. The method of producing an all-solid-state battery according to this embodiment includes producing a solid electrolyte structure by the method of producing a solid electrolyte structure according to one embodiment of the present invention, filling pores in a porous layer that forms the solid electrolyte structure with an active material precursor, and firing the active material precursor to form an electrode.

Specifically, the first ceramic material that includes a solid electrolyte is formed in the shape of a plate to obtain the first formed body 12, and the first formed body 12 is fired to form the dense body 2 (see FIG. 3). The second ceramic material that includes a solid electrolyte that is the same as or different from the solid electrolyte of the dense body 2 is applied to at least one surface of the dense body 2 (each surface of the dense body 2 in FIG. 4) to form the second formed body 13. The second formed body 13 is fired together with the dense body 2 at a temperature lower than the firing temperature employed for the first formed body 12 (see FIG. 3) to form the porous layer 3 that is integrally formed on at least one surface of the dense body 2 (see FIG. 4). The pores 4 (see FIG. 2) in the porous layer 3 of the solid electrolyte structure 1 are filled with an active material precursor, and the active material precursor provided in the pores 4 is fired to form the electrode 11 shown in FIG. 5.

The steps carried out to obtain the solid electrolyte structure 1 are the same as those of the method of producing a solid electrolyte structure according to one embodiment of the present invention. Therefore, description thereof is omitted.

As the active material precursor with which the pores 4 in the porous layer 3 of the solid electrolyte structure 1 are filled, an active material precursor in which the refined active material such as the positive active material or the negative active material described for the all-solid-state battery according to the present invention is dispersed in the form of a colloid using an organic solvent, an aqueous solvent, pure water, or the like, or an active material precursor that is a sol of the active material may be used, for example.

The pores 4 in the porous layer 3 of the solid electrolyte structure 1 may be filled with the active material precursor by dripping the active material precursor sol onto the surface of the porous layer 3 in air, an Ar atmosphere or under vacuum, or dipping the solid electrolyte structure 1 in the active material precursor sol, and causing the pores 4 in the porous layer 3 to be impregnated with the active material precursor under vacuum, for example.

The active material precursor with which the pores 4 in the porous layer 3 are filled is fired (heated) together with the solid electrolyte structure to volatilize the liquid (e.g., organic solvent) contained in the active material precursor (or burn the organic substance). When the pores 4 in the porous layer 3 are not sufficiently filled with the active material precursor by a single operation, the filling operation is repeated so that the pores 4 in the porous layer 3 are sufficiently filled with the active material precursor.

When the porous layer 3 is formed on each surface of the dense body 2 of the solid electrolyte structure 1 (see FIG. 5), the pores 4 in the porous layers 3 are filled with the positive active material precursor or the negative active material precursor, and the active material precursors are then fired. When the porous layer 3 is formed on one surface of the dense body 2 of the solid electrolyte structure 1 (see FIG. 6), the electrode 21 is formed by filling the pores 4 in the porous layer 3 with the active material precursor using the above-mentioned method. The electrode 22 is formed by a press method, a doctor-blade method, a roll coating method, or the like, and is disposed on the surface of the dense body 2 opposite to the surface on which the porous layer 3 is formed, by a method that applies and bonds the active material precursor or an adhesive paste formed of the same raw material as the solid electrolyte, a sputtering method, a resistive heating deposition method that heats and deposits the deposition source using a resistor, an ion-beam deposition method that heats and deposits the deposition source using ion beams, an electron beam deposition method that heats and deposits the deposition source using electron beams, or the like. For example, the electrode 22 may be formed by lithium metal (Li). In this case, the charge/discharge capacity increases.

According to the above configuration, the all-solid-state battery 10 that includes the solid electrolyte structure 1 in which the porous layer 3 is integrally formed on at least one surface of the dense body 2 by firing and the electrode 11 formed of the active material provided in the pores 4 in the porous layer 3 of the solid electrolyte structure 1 can be easily and inexpensively produced.

The method of producing an all-solid-state battery according to this embodiment may further include disposing the positive collector 14 and the negative collector 15 on the electrodes 11 (positive electrode 11a and negative electrode 11b). Examples of the material for the positive collector 14 and the negative collector 15 include platinum (Pt), platinum (Pt)/palladium (Pd), gold (Au), silver (Ag), aluminum (Al), copper (Cu), an indium-tin oxide film (ITO), an electron-conductive metal material, and the like.

The positive collector 14 and the negative collector 15 may be disposed on the electrodes 11 (positive electrode 11a and negative electrode 11b) by a sputtering method, a resistive heating deposition method that heats and deposits the deposition source using a resistor, an ion-beam deposition method that heats and deposits the deposition source using ion beams, an electron beam deposition method that heats and deposits the deposition source using electron beams, or the like. When placing the all-solid-state battery in a casing or the like, the positive collector 14 and the negative collector 15 are insulated.

EXAMPLES

The present invention is further described below by way of examples. Note that the present invention is not limited to the following examples.

Example 1

An $Li_{0.35}La_{0.55}TiO_3$ (solid electrolyte) powder (first ceramic material) was formed with a press-mold to obtain a first formed body having a diameter of about 13 mm and a thickness of 1 mm (dimensions after firing). The first formed body was fired at 1150° C. in air to obtain a dense body.

A screen printing paste (second ceramic material) was prepared using a solid electrolyte powder having the same composition as that of the solid electrolyte used for the first formed body. In this example, S-LEC B (manufactured by Sekisui Chemical Co., Ltd.) (binder), CS-12 (manufactured by Chisso Corporation) (organic solvent), and theobromine (pore-forming agent) were added to the solid electrolyte powder when preparing the screen printing paste corresponding to the design of pores formed in a porous layer. The screen printing paste was applied to the surface of the dense body by a screen printing method to obtain a second formed body having a diameter of about 12 mm and a thickness of 10 μm (dimensions after firing).

Figure 7:
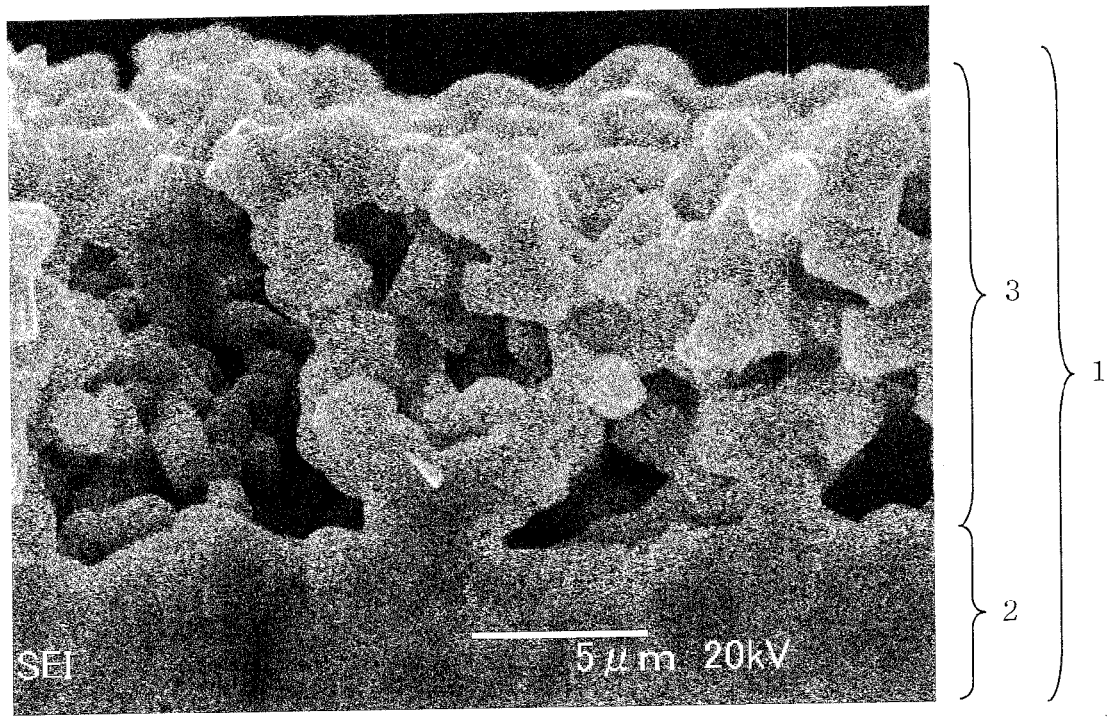
FIG. 7 shows an SEM photograph of the cross section of a dense body and a porous layer of a solid electrolyte structure produced in Example 1.

The second formed body was fired together with the dense body at a temperature lower than the firing temperature employed for the first formed body to form a porous layer that is integrally formed on at least one surface of the dense body. A solid electrolyte structure was thus produced. The second formed body was fired at 1100° C. in air. FIG. 7 shows an SEM photograph of the cross section of the dense body 2 and the porous layer 3 of the solid electrolyte structure 1 produced in Example 1.

The pores in the porous layer of the solid electrolyte structure were filled with an active material precursor sol to form an electrode. As the positive active material precursor, an LiCoO ($LiCoO_2$ precursor) sol solution was used. As the negative active material precursor, an LiTiO ($Li_4Ti_5O_{12}$ precursor) sol solution was used. The pores were filled with the active material precursor by dripping the active material precursor onto the porous layer and causing the pores to be impregnated with the active material precursor under vacuum.

The step of filling the pores with the active material precursor was repeated until the pores were filled with a desired amount of active material precursor. The product was fired at 450° C. in air to burn the remaining organic component each time of the filling operation was performed.

After the pores were filled with a given amount of active material precursor, the active material precursor was fired to form an electrode. The active material precursor was fired after filling the pores with the negative active material precursor and after filling the pores with the positive active material precursor. Specifically, after filling the pores with the negative active material precursor ($Li_4Ti_5O_{12}$), the active material precursor was fired at 800° C. to form the negative electrode. Then, after filling the pores with the positive active material precursor ($LiCoO_2$), the active material precursor was fired at 700° C. to form the positive electrode.

Gold (Au) was then sputtered onto the surface of each of the positive electrode and the negative electrode to form a collector having a thickness of about 50 nm.

The solid electrolyte structure in which the electrode was formed in the pores in the porous layer and the collector was formed on the surface of the porous layer was dried by heating under vacuum (130° C., overnight), and incorporated in a CR2032 coin battery in a glove box filling with an inert gas to obtain an all-solid-state battery (Example 1).

Example 2

Figure 8:
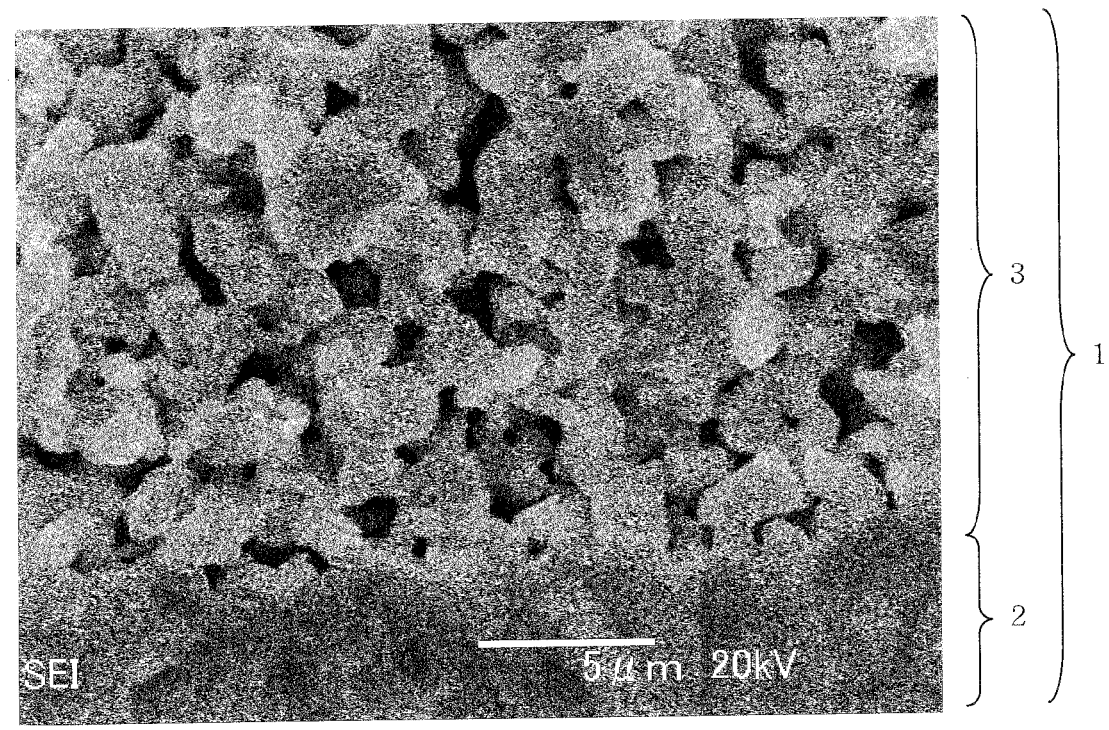
FIG. 8 shows an SEM photograph of the cross section of a dense body and a porous layer of a solid electrolyte structure produced in Example 2.

An all-solid-state battery (Example 2) was produced in the same manner as in Example 1, except that the screen printing paste (second ceramic material) used to form the porous layer of the solid electrolyte structure was prepared using the solid electrolyte powder, S-LEC B (manufactured by Sekisui Chemical Co., Ltd.) (binder), and CS-12 (manufactured by Chisso Corporation) (organic solvent) so that the porous layer had a porosity lower than that of the porous layer of Example 1 and the pore size of the pores was smaller than that of the porous layer of Example 1. FIG. 8 shows an SEM photograph of the cross section of the dense body 2 and the porous layer 3 of the solid electrolyte structure 1 produced in Example 2.

Example 3

An $Li_{1.5}Al_{0.5}Ge_{1.5}(PO_4)_3$ (solid electrolyte) powder (first ceramic material) was formed with a press-mold to obtain a first formed body having a diameter of about 13 mm and a thickness of 1 mm (dimensions after firing). The first formed body was fired at 840° C. in air to obtain a dense body.

A screen printing paste (second ceramic material) was prepared using a solid electrolyte powder having the same composition as that of the solid electrolyte used for the first formed body. In this example, S-LEC B (manufactured by Sekisui Chemical Co., Ltd.) (binder), CS-12 (manufactured by Chisso Corporation) (organic solvent), and theobromine (pore-forming agent) were added to the solid electrolyte powder when preparing the screen printing paste corresponding to the design of pores formed in a porous layer. The screen printing paste was applied to the surface of the dense body by a screen printing method to obtain a second formed body having a diameter of about 12 mm and a thickness of 20 µm (dimensions after firing).

The second formed body was fired together with the dense body at a temperature lower than the firing temperature employed for the first formed body to form a porous layer that is integrally formed on at least one surface of the dense body. A solid electrolyte structure was thus produced. The second formed body was fired at 800° C. in air.

The pores in the porous layer of the solid electrolyte structure were filled with an active material precursor sol to form an electrode. As the positive active material precursor, an $LiFePO_4$ precursor sol solution was used. As the negative active material precursor, an $Li_3V_2(PO_4)_3$ precursor sol solution was used. The pores were filled with the active material precursor by dripping the active material precursor onto the porous layer and causing the pores to be impregnated with the active material precursor under vacuum.

After the pores were filled with a given amount of active material precursor, the active material precursor was fired to form an electrode. The active material precursor was fired after filling the pores with the positive active material precursor and after filling the pores with the negative active material precursor. The active material precursor was fired at 600° C. in an Ar atmosphere when forming the negative electrode and the positive electrode.

Gold (Au) was then sputtered onto the surface of each of the positive electrode and the negative electrode to form a collector having a thickness of about 50 nm.

The solid electrolyte structure in which the electrode was formed in the pores in the porous layer and the collector was formed on the surface of the porous layer was dried by heating under vacuum (130° C., overnight), and incorporated in a CR2032 coin battery in a glove box containing an inert gas to obtain an all-solid-state battery (Example 3).

Example 4

Figure 9:
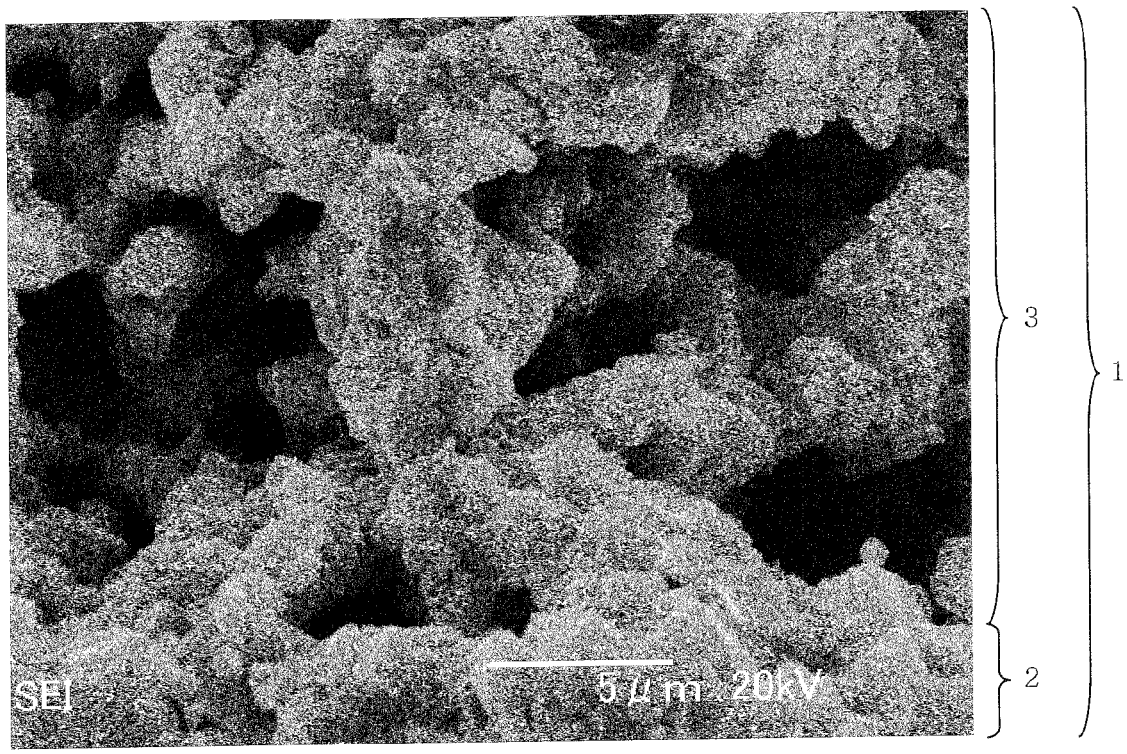
FIG. 9 shows an SEM photograph of the cross section of a dense body and a porous layer of a solid electrolyte structure produced in Example 4.

A solid electrolyte structure formed of $Li_{1.5}Al_{0.5}Ge_{1.5}(PO_4)_3$ was produced in the same manner as in Example 3. FIG. 9 shows an SEM photograph of the cross section of the dense body 2 and the porous layer 3 of the solid electrolyte structure 1 produced in Example 4.

The pores in the porous layer of the solid electrolyte structure were filled with an active material precursor sol to form an electrode. As the positive active material precursor, an $Li_3V_2(PO_4)_3$ precursor sol solution was used. As the negative active material precursor, an $Li_3V_2(PO_4)_3$ precursor sol solution was also used. The pores were filled with the active material precursor by dripping the active material precursor onto the porous layer and causing the pores to be impregnated with the active material precursor under vacuum in the same manner as in Example 3.

The step of filling the pores with the active material precursor was repeated until the pores were filled with a desired amount of active material precursor. The product was dried at 80° C. in air each time of the filling operation was performed.

After the pores were filled with a given amount of active material precursor, the active material precursor was fired to form an electrode. The active material precursor was fired once after filling the pores with the negative active material and the positive active material. The active material precursor was fired at 600° C. under an Ar atmosphere.

Gold (Au) was then sputtered onto the surface of each of the positive electrode and the negative electrode to form a collector having a thickness of about 50 nm.

The solid electrolyte structure in which the electrode was formed in the pores in the porous layer and the collector was formed on the surface of the porous layer was dried by heating under vacuum (130° C., overnight), and incorporated in a CR2032 coin battery in a glove box filling with an inert gas to obtain an all-solid-state battery (Example 4).

Comparative Example 1

An $Li_{0.35}La_{0.55}TiO_3$ (solid electrolyte) powder (first ceramic material) was formed with a press-mold to obtain a first formed body having a diameter of about 13 mm and a thickness of 1 mm (dimensions after firing). The first formed body was fired at 1150° C. in air to obtain a dense body (solid electrolyte layer).

A solid electrolyte powder having the same composition as that of the solid electrolyte used for the first formed body and an electrode material powder formed of the same active material as the active material for the positive electrode or the negative electrode of Example 1 were mixed to obtain a mixed powder. S-LEC B (manufactured by Sekisui Chemical Co., Ltd.) (binder) and CS-12 (manufactured by Chisso Corporation) (organic solvent) were added to the mixed powder to prepare a positive electrode screen printing paste and a negative electrode screen printing paste.

The negative electrode screen printing paste containing the negative active material was applied to one surface of the dense body by a screen printing method, and then fired at 800° C. The positive electrode screen printing paste containing the positive active material was applied to the other surface of the dense body by a screen printing method, and then fired at 700° C. A positive electrode and a negative electrode having a diameter of about 12 mm and a thickness of 10 μm (dimensions after firing) were thus formed on either surface of the dense body.

Gold (Au) was then sputtered onto the surface of each of the positive electrode and the negative electrode to form a collector having a thickness of about 50 nm.

The resulting laminate was incorporated in a CR2032 coin battery in a glove box containing an inert atmosphere to obtain an all-solid-state battery (Comparative Example 1).

Figure 10:
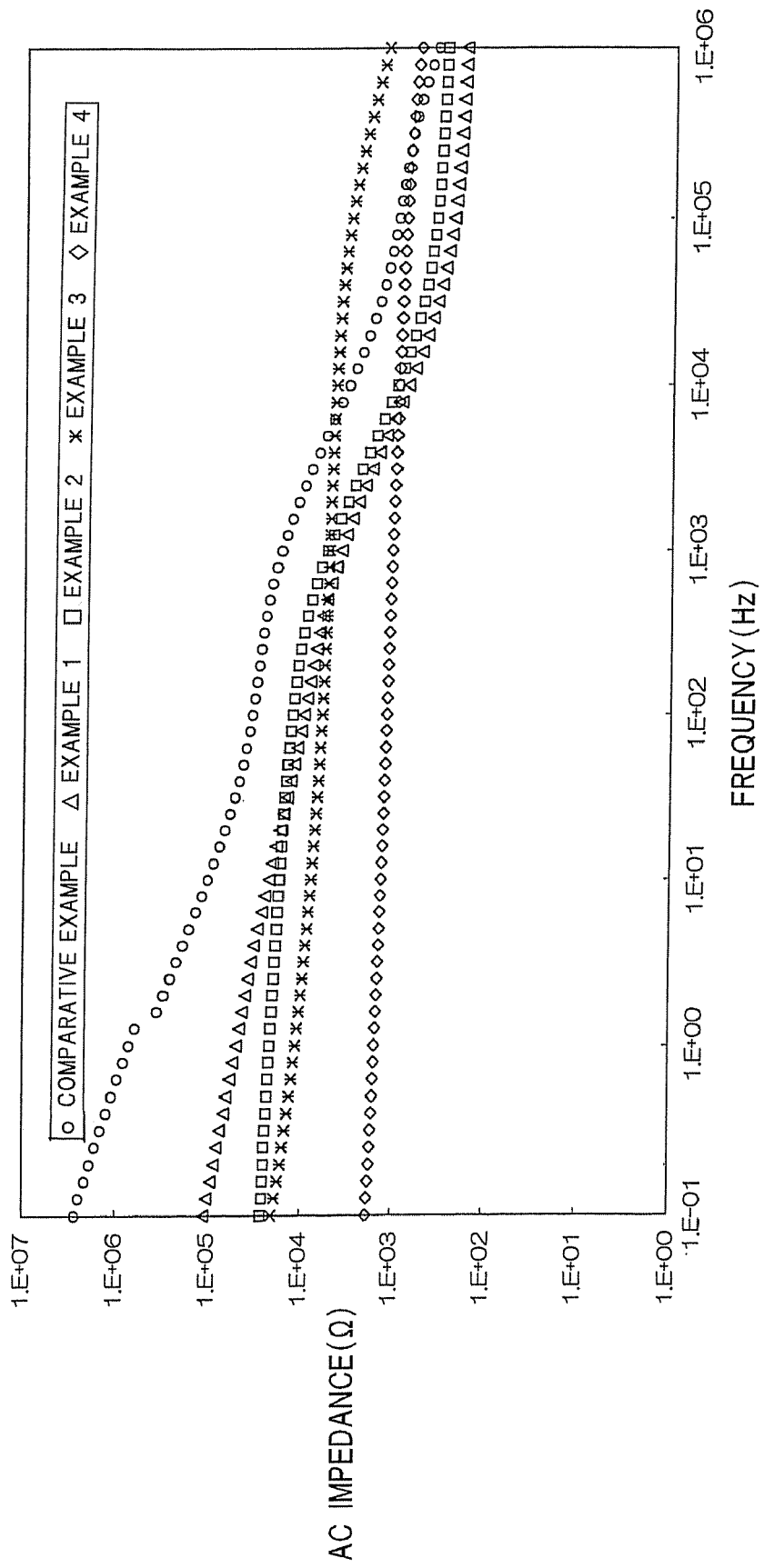
FIG. 10 is a graph showing AC impedance measurement results, wherein the vertical axis indicates AC impedance ($\Omega$) and the horizontal axis indicates frequency (Hz).

AC impedance measurement: The AC impedance was measured using a 1287 potentiostat/galvanostat and a 1255B frequency response analyzer (manufactured by Solartron). The AC impedance was measured at a frequency of 1 MHz to 0.1 Hz and a measurement signal voltage of 10 mV. FIG. 10 is a graph showing the measurement results. In FIG. 10, the vertical axis indicates AC impedance (Ω), and the horizontal axis indicates frequency (Hz). In the graph shown in FIG. 10, a triangle (Δ) indicates the measurement results of Example 1, a square (□) indicates the measurement results of Example 2, a cross (x) indicates the measurement results of Example 3, a diamond (◇) indicates the measurement results of Example 4, and a circle (○) indicates the measurement results of Comparative Example 1.

Internal impedance during charging/discharging: The spontaneous potential in a state in which the battery was open for a given period of time after completion of charging and the discharge potential immediately after starting discharging were measured. A value obtained by dividing the potential difference between the spontaneous potential and the discharge potential by the discharge current was taken as the internal impedance ($k\Omega \cdot cm^2$). Table 1 shows the internal impedance measurement results. Table 1 also shows the charge/discharge capability results.

TABLE 1

|  | Example 1 | Example 2 | Example 3 | Example 4 | Comparative Example 1 |
|---|---|---|---|---|---|
| Internal impedance during charging/discharging ($k\Omega \cdot cm^2$) | 146 | 34 | 20 | 2 | 1747 |
| Charge/discharge capability | Possible | Possible | Possible | Possible | Impossible |

(Discussion)

As is clear from the AC impedance measurement results shown in FIG. 10, the all-solid-state batteries of Examples 1 and 2 showed good results as compared with the all-solid-state battery of Comparative Example 1 (i.e., the AC impedance decreased by about one or two digits with respect to the low-frequency-side impedance that indicates the total impedance including the reaction resistance of the electrode and the electrolyte). Good results were also obtained by the all-solid-state batteries of Examples 3 and 4 in which the phosphoric acid compound was used as the solid electrolyte and the active material. In Example 4 in which the lithium phosphate compound having a NASICON structure was used as the active material, the internal impedance further decreased by one digit as compared with Examples 1 and 2 and Example 3 in which the lithium phosphate compound having an olivine structure was used.

Therefore, it was confirmed that the all-solid-state battery according to the present invention showed better results by selecting appropriate materials for the solid electrolyte and the active material. As shown in Table 1, the all-solid-state battery of Comparative Example 1 had a very high internal impedance during charging/discharging so that charging and discharging were impossible. The all-solid-state batteries of Examples 1 to 4 had a low internal impedance during charging/discharging so that charging and discharging were possible.

INDUSTRIAL APPLICABILITY

The all-solid-state battery according to the present invention is suitable as a battery for portable instruments, a built-in battery for IC cards, a battery for medical implant equipment, a battery mounted on a substrate surface, a battery (hybrid power supply battery) used in combination with another battery (e.g., solar battery), and the like.

The invention claimed is:

1. A solid electrolyte structure for all-solid-state batteries, the solid electrolyte structure consisting of a plate-like dense body formed of a ceramic that includes a solid electrolyte, and a porous layer formed of a ceramic that includes a solid electrolyte that is the same as or different from the solid electrolyte of the dense body, the porous layer being integrally formed on at least one surface of the dense body by firing to form the solid electrolyte structure.

2. The solid electrolyte structure according to claim 1, wherein the porous layer has a porosity of 10 to 70 vol %.

3. The solid electrolyte structure according to claim 1, wherein the porous layer is integrally formed on each surface of the dense body by firing.

4. The solid electrolyte structure according to claim 1, wherein each of the solid electrolyte included in the ceramic that forms the dense body and the solid electrolyte included in the ceramic that forms the porous layer is a phosphoric acid compound.

* * * * *